United States Patent [19]

Eldridge

[11] Patent Number: 4,558,535
[45] Date of Patent: Dec. 17, 1985

[54] THUMB-OPERATED TOUCH ROD FOR SPINNING REEL

[76] Inventor: Vernon F. Eldridge, 465 Chicopee Ave., Louisville, Ky. 40209

[21] Appl. No.: 636,953

[22] Filed: Aug. 2, 1984

[51] Int. Cl.$^4$ .............................................. A01K 89/00
[52] U.S. Cl. .......................................... 43/25; 43/20; 242/84.1 K; 242/84.21 R
[58] Field of Search ................................. 43/25, 20, 22; 242/84.1 K, 84.2 A, 84.2 H, 84.2 R, 84.21 R, 84.21 A

[56] References Cited

U.S. PATENT DOCUMENTS

| | | | |
|---|---|---|---|
| 2,648,505 | 8/1953 | Mauborgne | 43/20 |
| 2,804,711 | 9/1957 | Kozar | 43/25 |
| 2,810,982 | 10/1957 | Bucciarelli | 43/25 |
| 2,843,963 | 7/1958 | Butehorn | 43/25 |
| 2,966,314 | 12/1960 | Mombur | 242/84.21 R |
| 3,045,380 | 7/1962 | Meredith | 43/25 |
| 3,419,992 | 1/1969 | Strahm | 142/84.2 A |

FOREIGN PATENT DOCUMENTS 822851  11/1959  United Kingdom .......... 242/84.2 A

Primary Examiner—Nicholas P. Godici
Assistant Examiner—Kurt Rowan
Attorney, Agent, or Firm—Richard L. Caslin

[57] ABSTRACT

This invention relates to the art of fishing rods having open-faced spinning reels and especially to a thumb-operated touch rod for mounting on the top of the rod handle to be in cooperation with only special spinning reels which are furnished with an automatic bail release, sometimes known as a "Touch Bail". These special spinning reels were designed with an automatic bail release mechanism whereby the fishing line holding and release thereof is attained through manipulation of the line pickup bail by the user's index finger. A large proportion of anglers are more adept in the use of their thumbs in operating various maneuvers during fishing than in the use of their index fingers because some anglers have short fingers and have difficulty in grasping the rod handle and simultaneously manipulating the line pickup bail. This invention comprises a thumb-operated touch rod which is clamped to the rod handle above the spinning reel. There is a first clamping member fastened to the rod handle, and a vertically movable thumb-operated bar having guide means supported from the clamping member. The clamping member includes spring means acting on the thumb bar for urging it normally into a raised position. A thumb bar includes guides extending through the clamping member and carrying a touch rod for making engagement with the line pickup bail when both the reel is operated to retrieve the line and the thumb bar is depressed simultaneously. When the user releases the downward pressure on the thumb bar, the touch rod will move out of engagement with the line pickup bail and the bail will automatically swing forward to release its hold on the fishing line and allow the line to play out.

3 Claims, 7 Drawing Figures

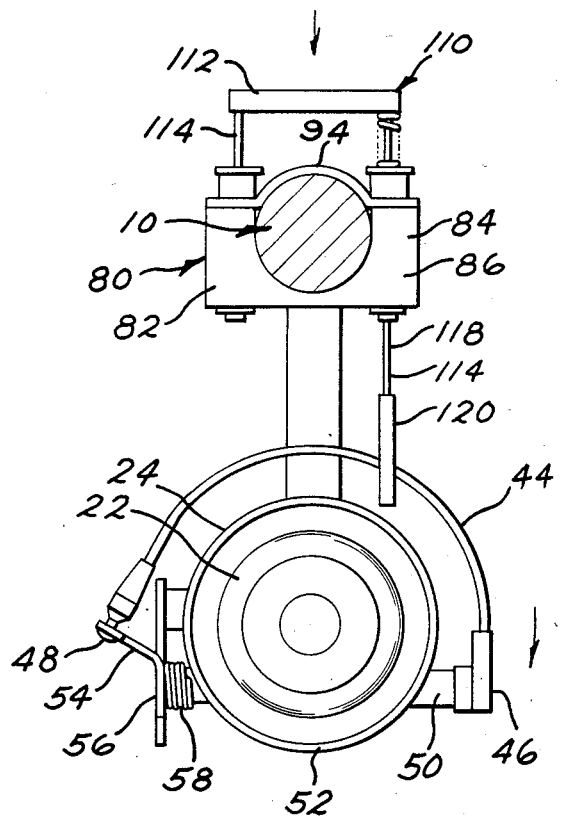
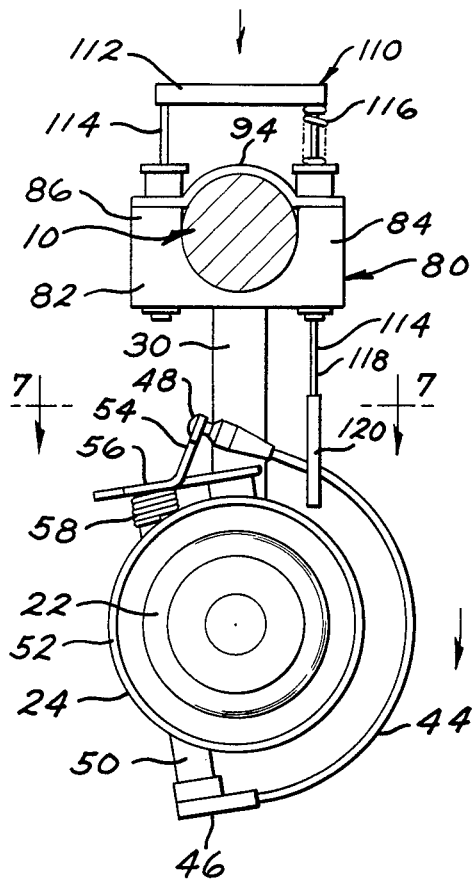
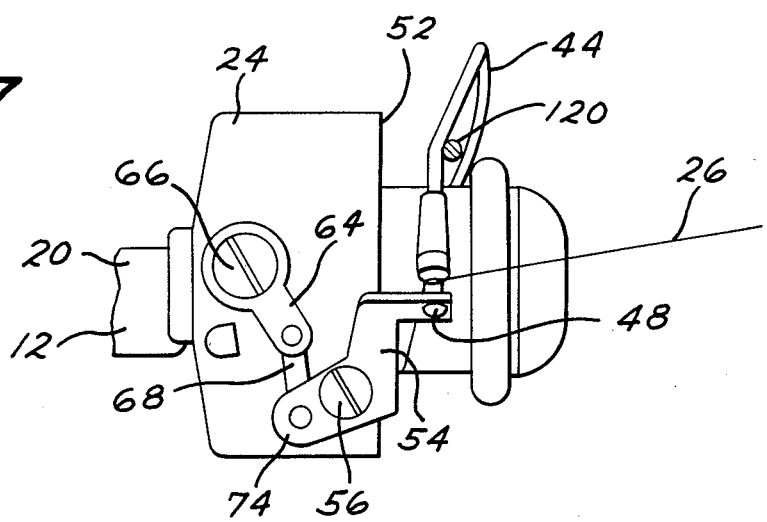

THUMB-OPERATED TOUCH ROD FOR SPINNING REEL

BACKGROUND OF THE INVENTION

1. Field of the Invention

This invention relates to the art of fishing rods for casting having an open-face spinning reel and particularly to such spinning reels which have an automatic line pickup bail mechanism where heretofore the user manipulated the line pickup bail by use of his index finger on the same hand that held the rod handle.

2. Description of the Prior Art

The most famous spinning reel in the United States, owned by more than 20 million fishermen, is the Mitchell 300 Series. An improved version of this is the Mitchell 440 Series which features the automatic line pickup bail such that when the reel handle is turned for retrieving the line the ball will normally swing from a forward position to a rearward position which causes an over-center linkage mechanism to lock the bail in this rear position. This Mitchell 440 Series spinning reel was designed to be operated by the user's index finger. The touching of the bail in its rear position would cause the over-center linkage mechanism to swing past center to the opposite over-center position such that when the user's finger was released from the bail, the bail would automatically open into its forward position during casting.

One recognized problem with the finger manipulation of the line pickup bail was that some user's were not adept in swinging the fishing rod handle at the same time that the fingers were manipulating the line pickup bail. Most anglers are better suited to operate a mechanism when the mechanism is in clear sight; for example, above the handle of the fishing rod rather than beneath the handle. The present invention was discovered to improve upon these special open-face spinning reels having automatic line-pickup bail release mechanisms by replacing the finger manipulation of the bail from beneath the rod handle by a thumb-operated touch rod.

No patents were found in the prior art after a careful patent novelty search through the files of the U.S. Patent and Trademark Office by the Applicant's representative.

OBJECTS OF THE PRESENT INVENTION

The principal object of the present invention is to provide a special open-face spinning reel having an automatic line pickup bail mechanism with a thumb-operated touch rod that is manipulated from the top side of the handle of a fishing rod for preparing the line pickup bail for automatic release during casting.

A further object of the present invention is to provide a thumb-operated touch rod for engagement with the line pickup bail of a spinning reel whereby the operation of the touch rod serves to prepare the bail for automatic release of the fishing line when the touch rod is released.

A further object of the present invention is to provide a fishing rod with a spinning reel having a line pickup bail with a thumb-operated touch rod accessory that may be mounted to the front end of the handle overlying the bail of the reel for cooperation with the bail when it is in its rearward position for positioning the bail into an automatic release position that causes the bail to swing forward as the rod as cast and the touch rod is released simultaneously.

SUMMARY OF THE INVENTION

The present invention provides an accessory for combination with an open-face spinning reel having a line pickup bail where the reel is supported beneath the handle of a casting rod. The accessory of the present invention is a thumb-operated touch rod that is mounted on the rod handle adjacent the bail. This invention includes a clamping member for engaging the rod handle and a thumb-operated bar supported from the clamping member and having spring means acting between the two members for urging the thumb bar normally into a raised position. The thumb bar includes guide means extending through the clamping member and carrying a touch rod that extends beneath the handle for making engagement with the line pickup bail when both the reel is operated to retrieve the line and the thumb bar is depressed simultaneously. The function of this invention is to allow the release of the line pickup bail from its rearward position to a forward casting position when the thumb bar is released by the user.

BRIEF DESCRIPTION OF THE DRAWINGS

This invention will be better understood from the following description taken in conjunction with the accompanying drawings, and its scope will be pointed out in the appended claims.

FIG. 5 is a transverse cross-sectional elevational view taken on the line 5—5 of FIG. 1 showing the line pickup bail in its rearward position which it assumes naturally when the handle of the spinning reel is turned to retrieve the line. In this FIG. 5, the thumb-operated touch rod has been depressed at the opportune time when the bail is in such position that the low end of the bail is adjacent the touch rod.

FIG. 6 is a transverse cross-sectional elevational view taken on the line 6—6 of FIG. 3 that is shown in a position quite similar to that of FIG. 5 except that the reel has turned clockwise as the touch rod approaches the high side of the bail. It is this portion of the cycle that the interaction of the touch rod and the bail causes the over-center mechanism to shift from the position of FIG. 1 to the position of FIG. 3.

FIG. 7 is a fragmentary top plan view of the spinning reel taken on the line 7—7 of FIG. 6 and showing the touch rod in its at-rest position at the high side of the bail just prior to the time that the touch rod would be released and the action taken as depicted in FIG. 4.

DESCRIPTION OF THE PREFERRED EMBODIMENTS

Figure 1:
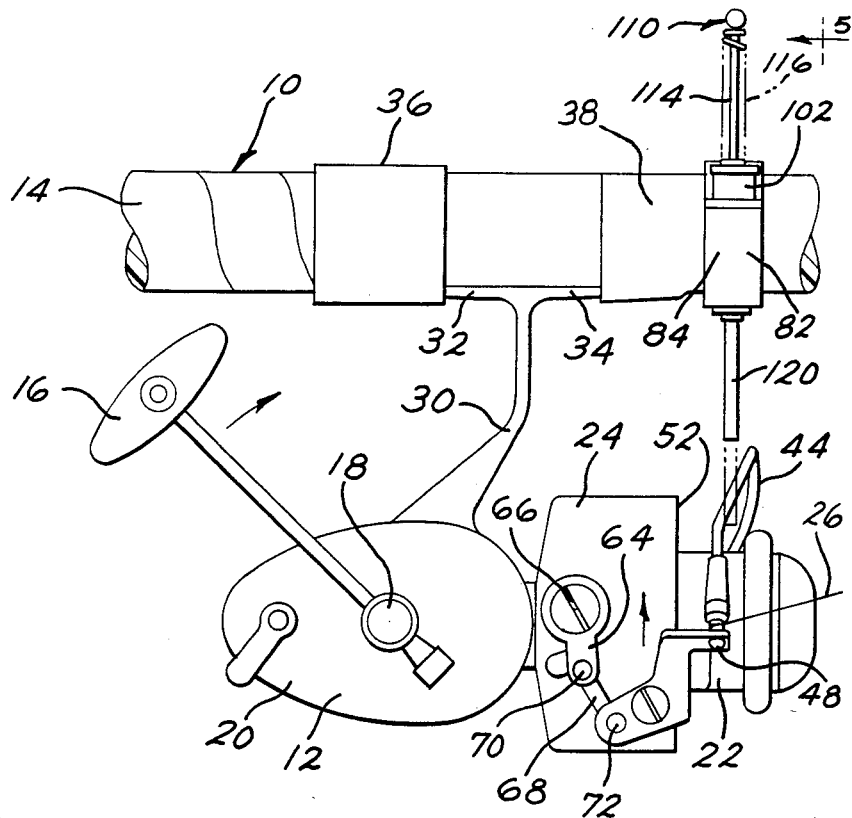
FIG. 1 is a fragmentary right side elevational view of a fishing rod in the vicinity of the front end of the handle showing a standard Mitchell 440 Series spinning reel furnished with a line pickup bail in its rearward line holding position, as well as showing the thumb-operated touch rod of the present invention clamped above the bail of the reel to the rod handle.

Turning now to a consideration of the drawings, and, in particular, to the fragmentary side elevational view of FIG. 1 there is shown a fishing rod 10 equipped with an open-face Mitchell 440 Series spinning reel 12 that is fastened beneath the handle 14 of the rod 10. The reel 12 has a winding handle 16 that is supported from a stub shaft 18 that stands out one side of the gear box 20. The spinning reel 12 has a non-rotating spool 22 which does move linearly in a reciprocating motion with respect to the rotating housing 24. Thus the turning of the handle 16 causes the rotating housing 24 to turn about a horizontal axis that is generally parallel to the longitudinal axis of the fishing rod 10. While the housing 24 is rotating, the non-rotating spool 22 is reciprocating in and out of the housing 24. Of course the fishing line 26 is wound on the spool 22 and the spool is made to reciprocate so that the line 26 may be wound evenly on the spool from one end to the other before the next layer of line is applied and then the multiple layers thereafter.

As is standard in this art, the spinning reel 12 is furnished with a mounting bracket 30 that has a pair of oppositely directed feet 32 and 34 at its top end for engagement by a pair of adjustable ferrules 36 and 38 which are used to fasten the reel 12 to the handle 14.

The rotating housing 24 is furnished with a pivoted line pickup bail 44 which is a wire-like member that is generally semicircular, as is best seen in FIG. 5. This bail 44 is a cam-like member that has a low side pivotal end 46 and a high side pivotal end 48. The low side pivotal end 46 has a pivotal axis 50 adjacent the front peripheral edges 52 of the rotating housing 24, while the high side pivotal end 48 of the bail 44 is supported from an eccentric crankarm 54 that has a pivotal axis 56 that generally coincides with the pivotal axis 50 of the other end of the bail 44, as is best seen in FIG. 5. A torsion spring 58 cooperates with this pivotal axis 56 and normally urges the bail 44 in its forward extended position, as is best seen in FIG. 4.

Since the low side pivotal end 46 of the bail 44 has a pivotal axis 50 adjacent the peripheral edge 52 of the housing 24, that end is considered the low side as compared with the fact that the high side pivotal end 48 is supported from the eccentric crankarm 54, as best seen in FIG. 7, which holds this high side pivotal end 48 extended in front of the peripheral edge 52 of the housing 24. Hence, the term "high side" means high with respect to the front peripheral edge 52 of the housing 24.

Figure 4:
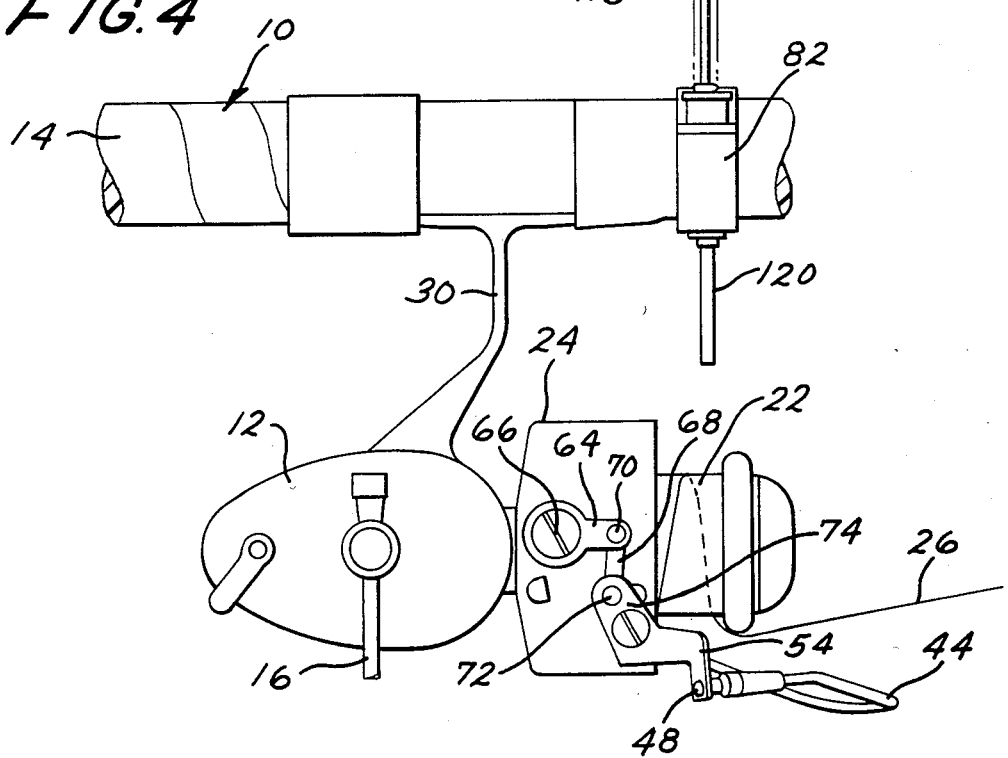
FIG. 4 is a fragmentary right side elevational view similar to that of FIGS. 1 and 3 but showing the touch rod released and in its upper position out of contact with the line pickup bail which earlier caused the bail to pivot forwardly and to release the fishing line for casting.

As stated earlier, the position of the spinning reel 12 in FIG. 4 is the normal casting position with the line pickup bail 44 shown in its forward extended position. Attention is directed to this FIG. 4 and the over-center crank mechanism 64 that is shown mounted as part of the rotating housing 24. This over-center crank mechanism 64 has a pivotal axis 66 that extends radially into the rotating housing 24. This over-center crank mechanism 64 has a second pivoted link 68 that is pivoted at one end 70 to the crankarm 64, and, at its opposite end 72, to a crankarm 74 that is an extension of the eccentric crankarm 54. When the winding handle 16 of the spinning reel 12 is turned clockwise in FIG. 4, the internal mechanism (not shown) within the rotating housing 24 will cause the over-center crank mechanism 64 to turn clockwise about 90 degrees to the position shown in FIG. 1. The result of this action is to move the over-center crank mechanism 64 over-center, as defined by an imaginary line drawn between the pivotal axis 66 and the pivotal axis 72. As this over-center mechanism operates, it also operates the eccentric crankarm 54 about its pivotal axis 56, which swings the line pickup bail 44 from the forward extended position of FIG. 4 to the rearward position of FIG. 1. Thus, as the winding handle 16 continues to turn clockwise, the rotating housing 24 will continue to rotate and the spool 22 will continue to reciprocate in and out of the housing and the fishing line 26 will be wound on the spool 22.

Figure 3:
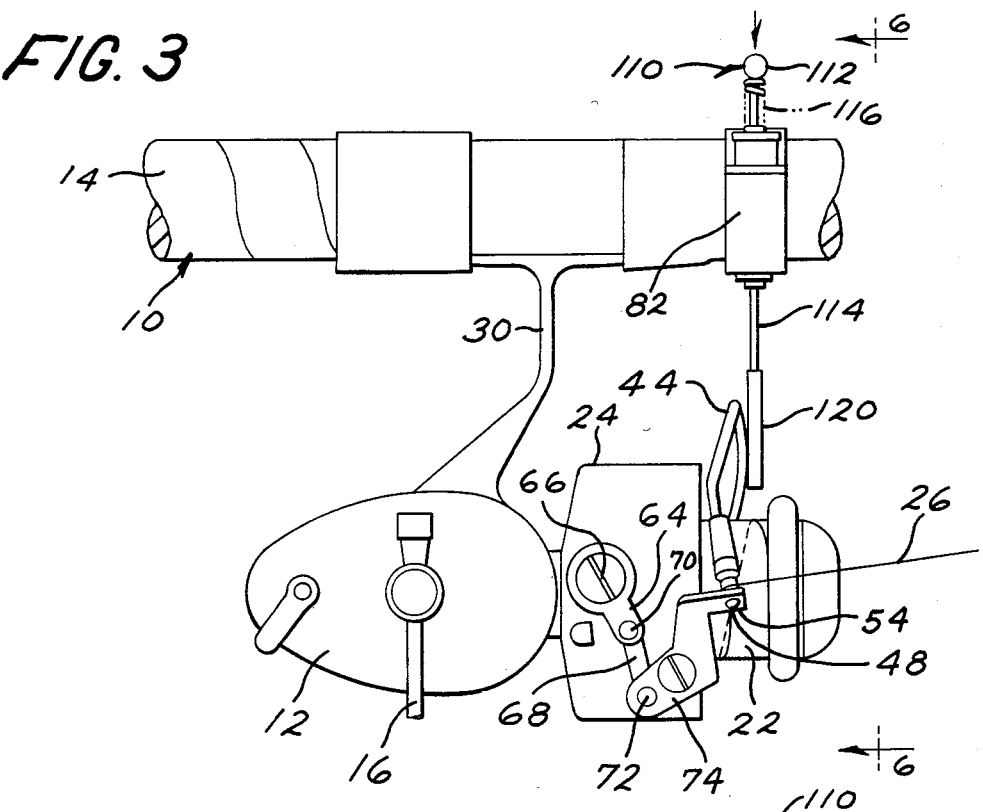
FIG. 3 is a fragmentary right side elevational view similar to that of FIG. 1 but showing the thumb-operated touch rod depressed into engagement with the line pickup bail which causes the over-center mechanism of the reel to shift from one side of center, as shown in FIG. 1, to the other side of center as shown in FIG. 3, thereby preparing the bail for automatic release once the touch rod is released by the user.

If the user were to grasp the handle 14 of the rod 10 in his left hand, where the grip would be in the vicinity of the mounting bracket 30, the user could employ the index finger of the left hand to reach down and touch the bail 44 and move it slightly rearwardly toward the butt end of the handle; this would cause the over-center crank mechanism 64 to move over-center from the position of FIG. 1 to the position of FIG. 3. This action, which was designed into the spinning reel 12, which is a Mitchell 440 Series spinning reel, by the manufacturer, tends to cock the over-center crank mechanism such that when the index finger is removed from the bail 44, the bail will swing forward and downward to the position shown in FIG. 4 due to the action of the torsion spring 58.

Figure 2:
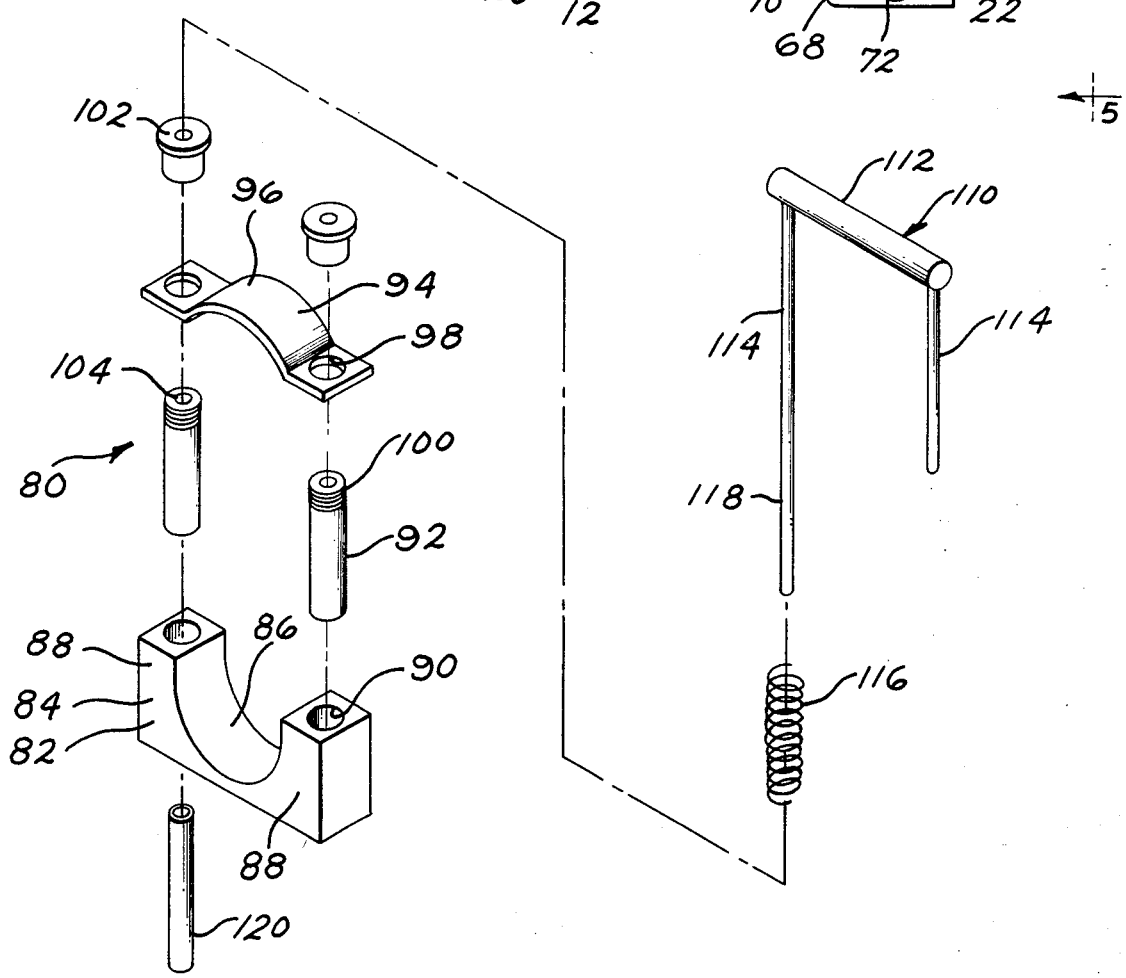
FIG. 2 is a fragmentary exploded view of the thumb-operated touch rod of the present invention so that the details of construction can be easily understood.

The present invention relates to an accessory 80, which is best shown in the exploded perspective view of FIG. 2, which is a thumb-operated touch rod for engaging the bail 44 when the bail is in its rear position, as shown in FIGS. 1, 3 and 5–7. Turning to a consideration of FIGS. 1, 2 and 5, the thumb-operated touch rod 80 will now be described. First, there is a clamping member 82 that is for use in clamping the touch rod 80 to the front end of the handle 14 of the rod 10. This clamping member 82 has a U-shaped block 84 with a semi-circular bearing 86 for receiving the handle 14 therein, as best seen in FIG. 5. Each side of the block 84 has a post-like member 88, and each is furnished with a vertical through-hole 90, each for receiving a brass bushing 92. The clamping member 82 is completed by a saddle strap member 94 which has an arched central section 96 to overlie the top portion of the handle 14. The opposite ends of this strap 94 are provided with openings 98 which slip over the top threaded end 100 of the bushing 92. An internally threaded cap 102 is provided to be threaded onto the threaded end 100 of the bushing for fastening the strap member 94 to the block member 84 and thereby completing the clamping member 82. Notice that the bushing 92 has a central bore 104. The U-shaped block 84 may be a plastic member, and the bushings 92 would be made fast to this block within the vertical holes 90.

There is a thumb-operated touch rod 110 that is to be mounted to the clamping member 82. This touch rod includes a thumb-engaging bar 112 which includes at each end a downwardly extending guide rod 114 which is adapted to extend through the bore 104 of the bushings 92. One of these guide rods is furnished with a compression spring of helical shape 116 which serves to normally urged the thumb bar 112 to its raised position.

One of the guide rods 114 is furnished with a lower extension 118 which is adapted to extend out from the bottom of the block 84, and to receive a plastic sleeve 120 thereover that serves as a limit means to prevent the guide rods 114 from being removed from the clamping member 82. Moreover, this plastic sleeve 120 is, in effect, the actual touch rod that is adapted to engage the line pickup bail 44.

As mentioned earlier, the semi-circular bail 44 has a low side end 46 and a high side end 48, and the touch rod 120 can only enter engagement with the bail 44 when the bail is in its rearward position, similar to that of FIG. 1, and when the touch rod 120 is adjacent the low side 46, as seen in FIG. 5. Once the touch rod 120 is in engagement with the bail 44, further movement of the bail in a clockwise position, as seen from FIG. 5 to FIG. 6, exerts a rearward pressure against the bail which causes the over-center crank mechanism 64 to move through center from the position of FIG. 1 to the position of FIG. 3. This serves to cock the bail such that when the thumb bar 112 is released, the spring 116 will raise the thumb bar, thereby raising the touch rod 120 out of engagement with the bail 44 and allowing the torsion spring 58 to swing the bail forwardly, as shown in FIG. 4.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. In combination with an open-face spinning reel having a line pickup bail, all supported beneath the handle of a casting rod, the invention comprising:
   a. a first clamping member adapted to be fastened adjacent the front end of the rod handle;
   b. a vertically movable thumb-operated bar having guide means supported from the clamping member, spring means acting between the clamping member and said thumb bar for urging the thumb bar normally into a raised position above the clamping member;
   c. the guide means extending downwardly below the clamping member and carrying a touch rod for making engagement with and depressing the said line pickup bail when both the reel is operated to retrieve the line and the thumb bar is depressed simultaneously;
   d. whereby the bail automatically springs open for instant casting when the thumb bar is released and the touch rod releases the bail.

2. The invention as recited in claim 1 wherein the said guide means is a pair of generally parallel rods which are adapted to straddle the rod handle and extend through mating openings in the said clamping member, the said thumb bar being connected to the top end of both guide rods and movable therewith, one of said guide rods having a lower extension for receiving the said touch rod thereon.

3. The invention as recited in claim 2 wherein the said clamping member comprises a U-shaped block having a semi-circular bearing spaced between two post-like members, the rod handle fitting into said bearing and a saddle strap member placed over the handle and fastened in position, the two post-like members containing the said mating openings for receiving the said guide rods therein.

* * * * *